United States Patent [19]

Kobayashi et al.

[11] Patent Number: 4,483,686
[45] Date of Patent: Nov. 20, 1984

[54] V-BELT AUTOMATIC TRANSMISSION

[75] Inventors: Takashi Kobayashi, Hamamatsu; Nobuo Wakano, Iwata, both of Japan

[73] Assignee: Yamaha Hatsudoki Kabushiki Kaisha, Japan

[21] Appl. No.: 524,916

[22] Filed: Aug. 19, 1983

[51] Int. Cl.³ .............................................. F16H 11/06
[52] U.S. Cl. ...................................... 474/11; 474/14; 474/93
[58] Field of Search ..................... 474/11, 13, 93, 14

[56] References Cited

U.S. PATENT DOCUMENTS 3,685,366  8/1972  Schupan ................................ 474/13
3,894,440  7/1975  Marceau ............................... 474/11
4,027,544  6/1977  Kobayashi ........................... 474/14

Primary Examiner—Stephen J. Novosad
Assistant Examiner—Frank H. McKenzie, Jr.
Attorney, Agent, or Firm—Ernest A. Beutler

[57] ABSTRACT

A variable speed V-belt transmission in which the axially movable pulley half has fixed to it a cap that defines an internal cavity in which the speed responsive mechanism is incorporated for axially moving this pulley half. The cap is formed with a plurality of apertures that pass a portion of the transmission when the axially movable pulley half is in one of its extreme positions for cooling the transmission.

9 Claims, 2 Drawing Figures

V-BELT AUTOMATIC TRANSMISSION

BACKGROUND OF THE INVENTION

This invention relates to a V-belt automatic transmission and more particularly to an improved construction for such a transmission.

V-belt automatic transmissions are used for a variety of purposes. Such transmissions include a split pulley having one pulley half that is axially fixed to the associated shaft and another pulley half that is axially movable relative to the shaft. A V-belt is received between the pulley halves and the speed ratio of the transmission is determined by the axial distance between the pulley halves and, accordingly, the radial distance of the V-belt relative to the associated shaft. A mechanism is provided for axially moving the axially movable pulley half in response to the shaft speed. In one type of transmission of this general type, the speed responsive mechanism is contained within an area defined by one of the pulley halves and a closure cap that is affixed to this pulley half. Such an arrangement provides a compact assembly and one which protects the internal components of the speed responsive mechanism and also affords some safety to the associated components from damage by the rotating components.

With this type of transmission there is a certain amount of frictional heat generated by the slippage between the V-belt and the pulley halves. The heat generated is increased under high torque and high load conditions. The enclosure of the speed responsive elements by means of a cap, as aforenoted, can prevent the dissipation of the generated heat. Therefore, such V-belt transmissions must be provided with a mechanism for cooling. One form in which such cooling has been accomplished is through the provision of cooling air openings in the enclosing cap. However, the provision of cooling air openings in the cap does not always insure adequate cooling since it is difficult to insure the appropriate amount of air flow through the respective openings. Various fan-like devices have, therefore, been proposed to insure adequate cooling air. These devices not only increase the weight of the unit but also its cost.

Another way of insuring adequate cooling would be to delete the enclosing cap. However, when this is done the components of the speed responsive mechanism are exposed and can cause concern on the part of the operator of damage. Furthermore, when the open construction is employed some arrangement is required to insure rigidity of the elements which are used to transfer the rotational force between the movable pulley half and the shaft. This function is normally provided by the cap in the enclosed type of transmission mechanism.

It is, therefore, a principal object of this invention to provide an improved V-belt type of automatic transmission.

It is another object of the invention to provide a V-belt automatic transmission of the generally enclosed type and which nevertheless is adequately cooled.

SUMMARY OF THE INVENTION

In accordance with the invention a V-belt automatic transmission includes a shaft, a pair of spaced pulley halves one of which is axially fixed to the shaft and the other of which is axially movable relative to the shaft. The pulley halves are adapted to receive a V-belt therebetween. A cap fixed to one of the pulley halves on the side opposite the other of the pulley halves defines a internal cavity. A spider member is rotatably coupled with the rotatable shaft and is contained within this cavity. The spider member and the one pulley half are supported for axial movement relative to each other and speed responsive means effect relative axial movement between the spider and the one pulley half and apply this relative axial movement into axial movement of the axially movable pulley half in response to the speed of the shaft. In accordance with the invention, the cap has at least one opening formed in it that is sized to pass a projecting portion of the spider when the spider and the pulley half are in an extreme axial position for effecting cooling of the transmission. The projecting portion of the spider does not pass through the opening when the spider and one pulley half are in the opposite, extreme axial position.

DETAILED DESCRIPTION OF THE PREFERRED EMBODIMENT

Figure 1:
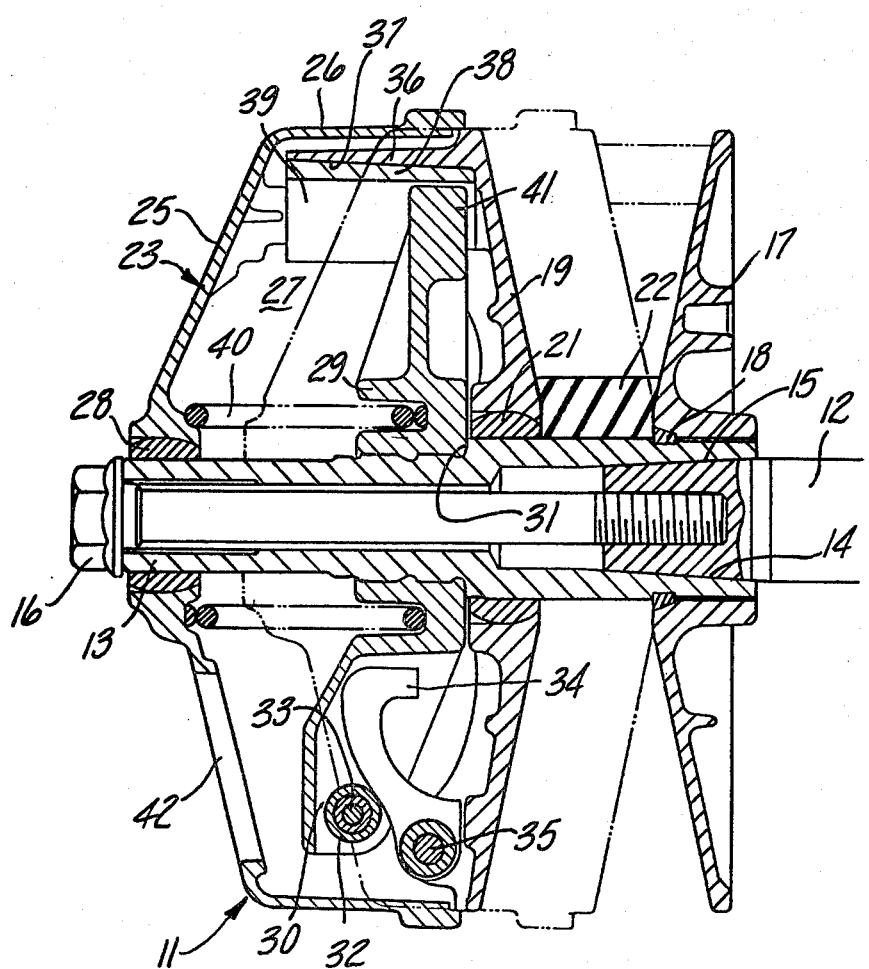
FIG. 1 is a cross-sectional view taken through the axis of the input shaft of a V-belt automatic constructed in accordance with an embodiment of the invention.
Figure 2:
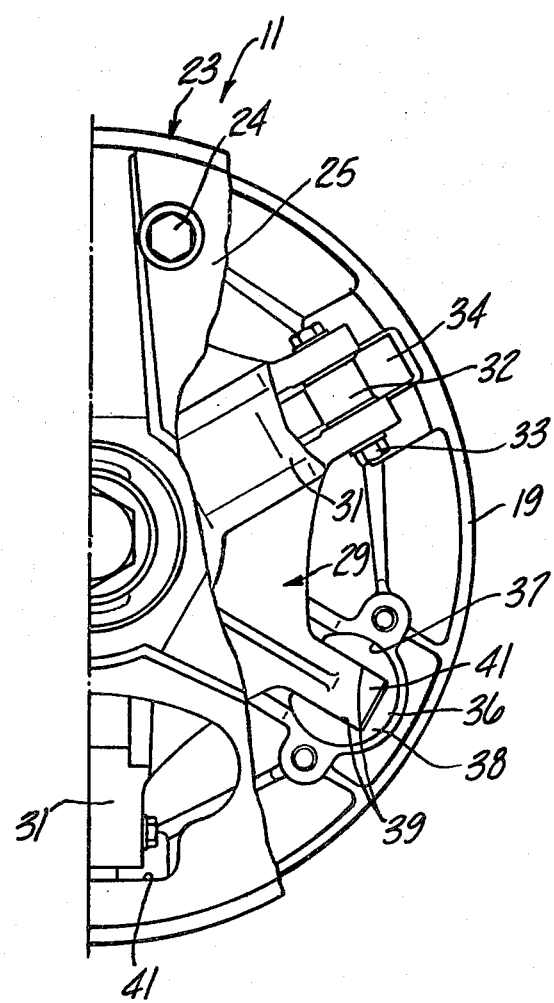
FIG. 2 is a one-half, front elevational view of the transmission, with a portion broken away.

In the drawings, the input or driving side of a variable speed V-belt driving transmission is shown. The driven side is conventional in construction and for that reason has not been illustrated. The variable speed transmission constructed in accordance with the invention is identified generally by the reference numeral 11 and is associated with an input or driving shaft 12 that is driven shaft 12 that is driven in a known manner from a suitable power plant, such as an internal combustion engine.

The transmission 11 has a generally hollow driving shaft 13 with a tapered bore 14 that cooperates with a suitable tapered surface 15 on the driving shaft 12 so as to rotatably couple the shafts 12 and 13. The shaft 13 is affixed to the shaft 12 by means of an elongated bolt 16.

A first, axially fixed pulley half 17 is affixed to the side of the hollow shaft 13 adjacent the driving shaft 12 by means including a split ring 18 in a known manner. A second, axially movable pulley half 19 is supported for sliding movement on the shaft 13 by means including a bearing 21. As disclosed in U.S. Pat. No. 4,027,544 entitled "V-belt Variable Speed Drive", issued June 7, 1977 in the name of Takashi Kobayashi and assigned to the assignee of this application, the bearing 23 is designed so as to permit some pivotal movement of the pulley half 19 relative to the shaft 13 so as to accommodate thrust loadings. The pulley halves 19 and 17 define an area therebetween that is adapted to receive a V-belt 22 as is known in this art.

A generally cup-shaped cap, indicated generally by the reference numeral 23 is affixed to the movable pulley half 19 by means of threaded fasteners 24. The cap 23 has a generally radially extending portion 25 and a generally axially extending cylindrical portion 26 that is matingly with the side of the pulley half 19 opposite to the pulley half 17. The cap 23 and pulley half 19 define a generally enclosed area, indicated by the reference numeral 27.

The inner portion of the cap part 25 accommodates a bearing 28 that permits axial movement of the cap 23 relative to the shaft 13 while accommodating some pivotal motion as described in aforenoted U.S. Pat. No. 4,027,544.

A mechanism for axially moving the pulley half 19 and cap 23 relative to the shaft 13 in response to speed variations is contained within the area 27. This mechanism includes a spider, indicated generally by the reference numeral 29 that is affixed in a suitable manner against rotation and axially to the shaft 13. For this purpose, the spider 29 may be engaged with a shoulder 30 formed on the shaft 13. A coil compression spring 40 encircles the shaft 13 and engages the inner portion of the cap part 25 and the rear face of the spider 29 so as to urge the movable pulley 19 and associated cap 25 to the solid line position shown in FIG. 1 wherein the speed ratio between the driving shaft 12 and the driven shaft (not shown) will be at the lowest numerical ratio. This transmission ratio is accompanied by relatively low speed of the driving shaft 12, as is well known in this art.

The means for axially the pulley half 19 and cap 23 relative to the pulley half 17 includes a plurality of arms 31 that are integrally formed with the spider 29. In the illustrated embodiment there are three arms 31. The arms 31 are bifurcated and support roller followers 32 on respective shafts 33 that are affixed to the arms 31.

Centrifugal cam members 34 are pivotally supported on the axially movable pulley half 19 within the area 27 in proximity to the rollers 32 on shafts 35. As is well known, increases in rotational speed of the pulley half 19 will cause pivotal movements of the centrifugal cams 34 which will coact with the rollers 32 to urge the pulley half 19 and cup-shaped cap 23 axially toward the broken line position as shown in FIG. 1. This movement causes the V-belt 22 to move radially outwardly and effect a decrease in the numerical speed ratio between the drive shaft 12 and the driven shaft.

The axially movable pulley half 19 is rotatably coupled to the spider 29 and, accordingly, the shaft 13 by the structure now to be described. The inner portion of the pulley half 19 within the area 27 is formed with a plurality of axially extending projections 36. In the illustrated embodiment, there are three such projections 36 and they are spaced between the arms 31 of the spider 29. Each projection has a generally tapered bore 37 formed in it which bore receives an anti-friction insert 38. The insert 38 is detachably connected within the bore 37 in a suitable manner, as by a press fit, and defines a pair of facing guide surfaces 39.

The spider 29 is provided with radially extending arms 41 that are interposed between the arms 31 and which have oppositely facing surfaces that are slidably engaged with the guide member surfaces 39. Hence, there is established a driving connection between the spider 29 and the pulley half 19 which accommodates axial movement of the pulley half 19 relative to the spider 29. Because of the high forces which may be transmitted through the bearing surfaces 39, the bearing members 38 may be readily removed and replaced if wear occurs. If desired, the bearing members 38 may be formed from a material that is softer than the spider 29 so that the bearing members 38 will wear rather than the arms 41.

During operation there will be frictional heat generated due to slippage between the belt 22 and the pulley halves 17 and 19. The amount of heat generated increases as the load and speed of transmission increases. While providing containment of the mechanism for axially moving the pulley half 19 and its associated guiding arrangement and still providing adequate cooling, the portion 25 of the cap 23 is provided with a plurality of apertures 42. In the illustrated embodiment, there is an opening or aperture 42 aligned with each of the spider arms 31. The openings 42 are sized and spaced so that as the speed of the driving shaft 13 increases and the pulley half 19 and cap 23 move axially, the arms 31 will eventually extend through the openings 42 and be exposed to the surrounding environment. Hence, the arms 31 will be exposed in free air when the transmission 11 has moved to the phantom position as shown in FIG. 1 and there will be very good cooling of the transmission 11 under this high load condition. When the transmission 11 is rotating at a low speed, the arms 31 will be contained within the area 27 as shown in the solid line view of FIG. 1. In addition to the direct cooling under high load afforded by the projection of the arms 31 through the openings 42, the arms 31 will act as fan blades under this condition so as to further improve the cooling of the cover 23 and the internal components of the transmission 11. By providing such cooling, the life of the V-belt 22 and the components of the transmission 11 will be significantly lengthened.

In the illustrated embodiments the openings 42 are sized so as to pass the arms 31 of the spider 29 that are associated with the mechanism for changing the axial position in response to speed variations. If desired, other projections may be formed on the spider 29 that are adapted to extend through the openings 42 or additional openings formed in the cap 23 so as to afford cooling when the pulley half 19 is in one of its extreme axial positions. Furthermore, the invention is susceptible of use with transmissions having other types of mechanisms for accomplishing the axial movement than the centrifugal weights and roller followers as described in the illustrated embodiment. Various other changes and modifications may be made, without departing from the spirit and scope of the invention, as defined by the appended claims.

We claim:
1. In a V-belt automatic transmission comprising a shaft, a pair of spaced pulley halves one of which is axially affixed to said shaft and the other of which is axially movable relative to said shaft, said pulley halves being adapted to receive a V-belt therebetween, a cap fixed to one of said pulley halves on the side opposite the other of said pulley halves and defining with said one pulley half an internal cavity, a spider member rotatably coupled with said shaft and contained within said cavity, said spider member and said one pulley half being supported for axial movement relative to each other, and speed responsive means for effecting relative axial movement between said spider member and said one pulley half and for applying said relative axial movement into axial movement of the axially movable pulley half in response to the speed of said shaft, the improvement comprising said cap having at least one opening formed therein sized to pass a projecting portion of said spider member when said spider member and said one pulley half are in an extreme axial position for cooling of said transmission, said projecting portion being contained completely within the internal cavity when said spider and said one pulley half are in the opposite extreme axial position.

2. A V-belt automatic transmission as set forth in claim 1, wherein the cap member has a plurality of openings formed therein, each sized to pass a respective projecting portion of the spider member.

3. A V-belt automatic transmission as set forth in claim 2, wherein the projecting portions of the spider member comprise outwardly extending arms.

4. A V-belt automatic transmission as set forth in claim 3, wherein the arms carry a portion of the speed responsive means.

5. A V-belt automatic transmission as set forth in claim 4, wherein the spider member is axially fixed to the shaft and the speed responsive means carried by the spider member arms comprise roller followers, there being centrifugal weights pivotally supported by the one pulley half and engageable with said roller members for effecting the relative axial movement.

6. A V-belt automatic transmission as set forth in claim 4, wherein the arms carrying the speed responsive means are interposed between further spider member arms, said further arms carrying means engageable with means on the one pulley half for rotatably coupling said spider member and said one pulley half to each other.

7. A V-belt automatic transmission as set forth in claim 6, wherein the means for rotatably coupling the spider member to the one pulley half includes removable bearing means.

8. A V-belt automatic transmission as set forth in claim 7, wherein the spider member is axially fixed to the shaft and the speed responsive means carried by the spider member arms comprise roller followers, there being centrifugal weights pivotally supported by the one pulley half and engageable with said roller members for effecting the relative axial movement.

9. A V-belt automatic transmission as set forth in claim 8, wherein the removable bearing means are contained within tapered cylindrical bores formed in the one pulley half and define facing bearing surfaces that engage outwardly extending portions of the respective spider member arms.

* * * * *

UNITED STATES PATENT AND TRADEMARK OFFICE
CERTIFICATE OF CORRECTION

PATENT NO. : 4,483,686
DATED : November 20, 1984
INVENTOR(S) : Takashi Kobayashi et al It is certified that error appears in the above-identified patent and that said Letters Patent is hereby corrected as shown below:

Column 2, line 12, after "the" add -- one --.
Column 2, line 21, after "automatic" add -- transmission --.
Column 2, lines 35-36, delete "that is driven shaft 12".
Column 2, line 62, after "matingly" add -- engaged --.
Column 3, line 20, after "axially" add -- moving --.
Column 4, line 63, after "spider" add -- member --.

Signed and Sealed this

Twenty-first Day of May 1985

[SEAL]

Attest:

DONALD J. QUIGG

Attesting Officer *Acting Commissioner of Patents and Trademarks*